US006920888B2

(12) United States Patent
Ko (10) Patent No.: US 6,920,888 B2
(45) Date of Patent: Jul. 26, 2005

(54) FOLDABLE STICK ASSEMBLY

(76) Inventor: Kuo-Chi Ko, 58 Ma Yuan West St., Taichung (TW)

(*) Notice: Subject to any disclaimer, the term of this patent is extended or adjusted under 35 U.S.C. 154(b) by 24 days.

(21) Appl. No.: 10/291,924

(22) Filed: Nov. 8, 2002

(65) Prior Publication Data

US 2004/0089334 A1 May 13, 2004

(51) Int. Cl.[7] .................................................. A45B 9/00
(52) U.S. Cl. ........................ 135/74; 135/65; 248/155.4
(58) Field of Search ............................. 248/155, 155.4, 248/155.5; 135/65, 74, 77, 84; 403/93, 96

(56) References Cited

U.S. PATENT DOCUMENTS

| | | | | |
|---|---|---|---|---|
| 2,127,976 A | * | 8/1938 | K-Howat ...................... | 135/66 |
| 4,180,503 A | * | 12/1979 | vor der Bruck et al. .... | 534/761 |
| 4,437,480 A | * | 3/1984 | Husa ........................... | 135/74 |
| 4,527,579 A | * | 7/1985 | Knotter et al. ............... | 135/74 |
| 5,139,283 A | * | 8/1992 | Dow et al. ................... | 280/819 |
| 5,277,438 A | * | 1/1994 | Chuang ........................ | 280/42 |
| 6,142,527 A | * | 11/2000 | Lenhart ........................ | 280/823 |
| 6,199,245 B1 | * | 3/2001 | Blessing ....................... | 16/430 |
| 6,622,741 B2 | * | 9/2003 | Lai .............................. | 135/20.3 |

* cited by examiner

Primary Examiner—Ramod O. Ramirez
Assistant Examiner—Amy J. Sterling
(74) Attorney, Agent, or Firm—Alan D. Kamrath; Nikolai & Mersereau, P.C.

(57) ABSTRACT

A foldable stick assembly includes a foldable tube unit, a sliding handle, a push rod unit, a ratchet socket, an upper ratchet, a pawl member, a lower ratchet, and a push block. The foldable tube unit includes a handle, an upper mounting tube, a lower mounting tube, an upper pivot sleeve, and a lower pivot sleeve. The push rod unit includes a main push rod and an upper push rod. Thus, the foldable stick assembly may be used to cut and remove the weeds and to loosen the soil. In addition, the foldable stick assembly is folded easily and conveniently, so that the volume of the foldable stick assembly is reduced, thereby facilitating storage and transportation of the foldable stick assembly, and thereby decreasing the cost of assembly.

18 Claims, 10 Drawing Sheets

FOLDABLE STICK ASSEMBLY

BACKGROUND OF THE INVENTION

1. Field of the Invention

The present invention relates to a foldable stick assembly that may be used to cut and remove the weed and to loosen the soil, and more particularly to a foldable stick assembly that is folded easily and conveniently, so that the volume of the foldable stick assembly is reduced, thereby facilitating storage and transportation of the foldable stick assembly, and thereby decreasing the cost of assembly.

2. Description of the Related Art

A conventional stick may be rested on the ground to provide an auxiliary support effect for the older people. However, the conventional stick has a fixed structure and cannot be folded, so that the volume of the stick is greatly increased, thereby causing inconvenience in storage of the stick, and thereby increasing the cost of transportation.

SUMMARY OF THE INVENTION

The present invention has arisen to mitigate and/or obviate the disadvantage of the conventional stick.

The primary objective of the present invention is to provide a foldable stick assembly that may be used to cut and remove the weeds.

Another objective of the present invention is to provide a foldable stick assembly that may be used to loosen the soil.

A further objective of the present invention is to provide a foldable stick assembly that is folded easily and conveniently, so that the volume of the foldable stick assembly is greatly reduced, thereby facilitating storage and transportation of the foldable stick assembly, and thereby decreasing the cost of assembly.

A further objective of the present invention is to provide a foldable stick assembly including three upright posts that are rested on the ground to provide an auxiliary support effect for the older people.

In accordance with the present invention, there is provided a foldable stick assembly, comprising a foldable tube unit, a sliding handle, a push rod unit, a ratchet socket, an upper ratchet, a pawl member, and a lower ratchet, wherein:

the foldable tube unit includes a handle, an upper mounting tube, a lower mounting tube, an upper pivot sleeve, and a lower pivot sleeve, wherein:

the upper mounting tube of the foldable tube unit has a lower portion formed with a longitudinal slide slot;

the upper pivot sleeve of the foldable tube unit is mounted on the outer wall of a lower end of the upper mounting tube of the foldable tube unit; and the lower pivot sleeve of the foldable tube unit is mounted on the outer wall of the upper end of the lower mounting tube of the foldable tube unit, and is combined with the upper pivot sleeve of the foldable tube unit;

the sliding handle includes a sleeve mounted on the outer wall of the upper mounting tube and having a periphery formed with a circular hole;

the push rod unit includes a main push rod and an upper push rod, wherein:

the upper push rod of the push rod unit is slidably mounted in the upper mounting tube, and is fixed to the sleeve of the sliding handle, the upper push rod of the push rod unit has an upper end formed with an enlarged head formed with a fixing hole, a fixing bolt is extended through the circular hole of the sleeve of the sliding handle, the longitudinal slide slot of the upper mounting tube, and is inserted into the fixing hole of the upper push rod, so that the upper push rod is fixed on the sleeve of the sliding handle to move therewith; and the main push rod of the push rod unit is slidably mounted in the lower mounting tube, and is moved by the upper push rod of the push rod unit, the main push rod of the push rod unit has a mediate portion formed with a catch, a spring is mounted on the main push rod of the push rod unit, and is rested on the catch of the main push rod;

the ratchet socket is fixed on the lower end of the lower mounting tube, and has an upper end formed with an annular groove for insertion of the lower end of the lower mounting tube and a lower end formed with a hexagonal mounting recess and provided with a guide tube located in the hexagonal mounting recess;

the pawl member is mounted on the ratchet socket, and is formed with an opening, the pawl member has an inner wall formed with an annular step for supporting the ratchet socket, the pawl member has a bottom provided with three upright posts each having a pointed tip, a catch ring is fixed in the opening of the pawl member, and is rested on a top of the ratchet socket;

the lower ratchet is secured on a bottom of the opening of the pawl member; and the upper ratchet is mounted in the pawl member and is engaged with the lower ratchet, the upper ratchet has a top formed with a hexagonal mounting section mounted in the hexagonal mounting recess of the ratchet socket.

Further benefits and advantages of the present invention will become apparent after a careful reading of the detailed description with appropriate reference to the accompanying drawings.

DETAILED DESCRIPTION OF THE INVENTION

Figure 7:
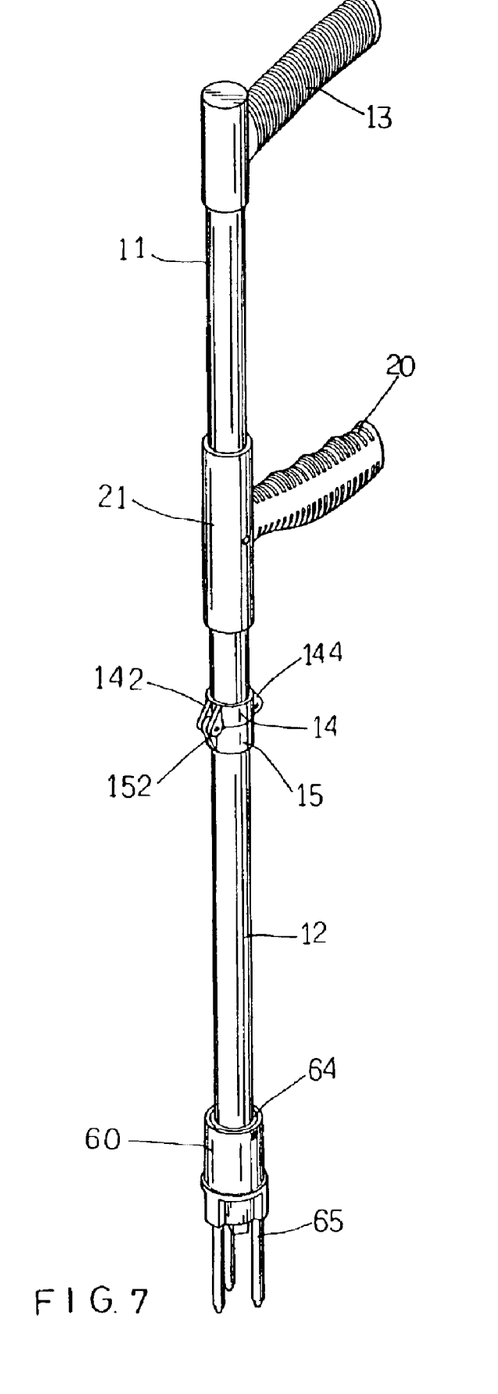
FIG. 7 is a perspective assembly view of the foldable stick assembly as shown in FIG. 1.

Referring to the drawings and initially to FIGS. 1–4 with reference to FIG. 7, a foldable stick assembly in accordance with a preferred embodiment of the present invention comprises a foldable tube unit 10, a sliding handle 20, a push rod unit 30, a ratchet socket 40, an upper ratchet 50, a pawl member 60, a lower ratchet 70, and a push block 80.

Figure 1:
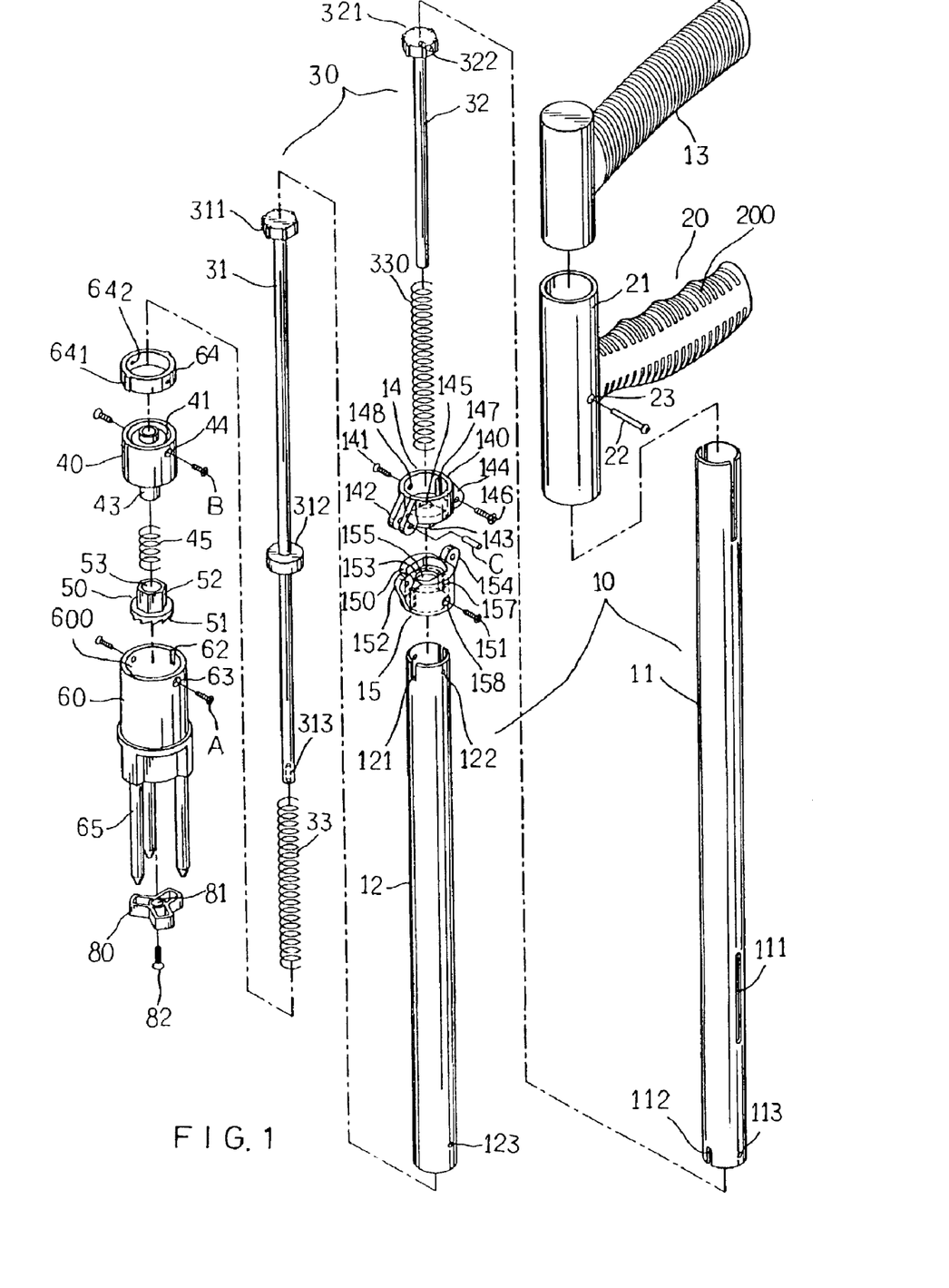
FIG. 1 is an exploded perspective view of a foldable stick assembly in accordance with a preferred embodiment of the present invention.
Figure 2:
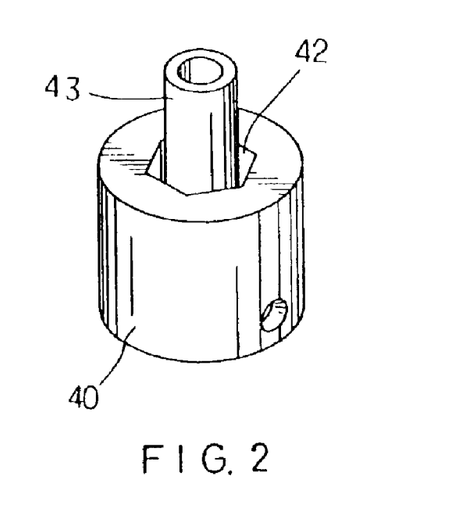
FIG. 2 is a bottom perspective view of a ratchet socket of the foldable stick assembly as shown in FIG. 1.

The foldable tube unit 10 includes a handle 13, an upper mounting tube 11, a lower mounting tube 12, an upper pivot sleeve 14, and a lower pivot sleeve 15.

The handle 13 of the foldable tube unit 10 is mounted on the upper end of the upper mounting tube 11 of the foldable tube unit 10.

The upper mounting tube 11 of the foldable tube unit 10 has a lower portion formed with a longitudinal slide slot 111. The upper mounting tube 11 of the foldable tube unit 10 has a lower end formed with two opposite longitudinal insertion grooves 112 and two opposite combination holes 113.

The lower mounting tube 12 of the foldable tube unit 10 has an upper end formed with two opposite longitudinal insertion grooves 121 and two opposite combination holes 122, and a lower end formed with two opposite combination holes 123.

The upper pivot sleeve 14 of the foldable tube unit 10 is mounted on the outer wall of the lower end of the upper mounting tube 11 of the foldable tube unit 10, and has an inner wall 140 formed with two opposite inner insertion ribs 147-inserted into the two opposite longitudinal insertion grooves 112 of the upper mounting tube 11. The upper pivot sleeve 14 of the foldable tube unit 10 has a periphery formed with a combination hole 148 for passage of a screw 141 which is screwed into one of the two opposite combination holes 113 of the upper mounting tube 11, so that the upper pivot sleeve 14 of the foldable tube unit 10 is fixed on the upper mounting tube 11 of the foldable tube unit 10. The upper pivot sleeve 14 of the foldable tube unit 10 has an outer wall formed with two spaced pivot ears 142 and a positioning plate 144. The upper pivot sleeve 14 of the foldable tube unit 10 has a bottom protruded with an insertion body 143 and formed with a through hole 145.

The lower pivot sleeve 15 of the foldable tube unit 10 is mounted on the outer wall of the upper end of the lower mounting tube 12 of the foldable tube unit 10, and has an inner wall 150 formed with two opposite inner insertion ribs 157 inserted into the two opposite longitudinal insertion grooves 121 of the lower mounting tube 12. The lower pivot sleeve 15 of the foldable tube unit 10 has a periphery formed with a combination hole 158 for passage of a screw 151 which is screwed into one of the two opposite combination holes 122 of the lower mounting tube 12, so that the lower pivot sleeve 15 of the foldable tube unit 10 is fixed on the lower mounting tube 12 of the foldable tube unit 10. The lower pivot sleeve 15 of the foldable tube unit 10 has an outer wall formed with a pivot seat 152 mounted between the two spaced pivot ears 142 of the upper pivot sleeve 14. A pivot pin "C" is extended through the two spaced pivot ears 142 of the upper pivot sleeve 14 and the pivot seat 152 of the lower pivot sleeve 15, so that the two spaced pivot ears 142 of the upper pivot sleeve 14 are pivotally mounted on the pivot seat 152 of the lower pivot sleeve 15. The outer wall of the lower pivot sleeve 15 of the foldable tube unit 10 is formed with a positioning plate 154. A screw 146 is extended through the positioning plate 154 of the lower pivot sleeve 15 and is screwed into the positioning plate 144 of the upper pivot sleeve 14, thereby locking the positioning plate 154 of the lower pivot sleeve 15 and the positioning plate 144 of the upper pivot sleeve 14. The lower pivot sleeve 15 of the foldable tube unit 10 has a top formed with an insertion hole 153 for insertion of the insertion body 143 of the upper pivot sleeve 14, and formed with a through hole 155 aligning with the through hole 145 of the upper pivot sleeve 14.

The sliding handle 20 includes a sleeve 21 mounted on the outer wall of the upper mounting tube 11, and a handgrip 200 secured on the sleeve 21. The sleeve 21 of the sliding handle 20 has a periphery formed with a circular hole 23.

The push rod unit 30 includes a main push rod 31 and an upper push rod 32.

The upper push rod 32 of the push rod unit 30 is slidably mounted in the upper mounting tube 11, and is fixed to the sleeve 21 of the sliding handle 20. The upper push rod 32 of the push rod unit 30 has an upper end formed with an enlarged head 321 formed with a fixing hole 322. A spring 330 is mounted on the upper push rod 32 of the push rod unit 30, and is rested on the enlarged head 321 of the upper push rod 32. A fixing bolt 22 is extended through the circular hole 23 of the sleeve 21 of the sliding handle 20, the longitudinal slide slot 111 of the upper mounting tube 11, and is inserted into the fixing hole 322 of the upper push rod 32, so that the upper push rod 32 is fixed on the sleeve 21 of the sliding handle 20 to move therewith.

The main push rod 31 of the push rod unit 30 is slidably mounted in the lower mounting tube 12, and is moved by the upper push rod 32 of the push rod unit 30. The main push rod 31 of the push rod unit 30 has an upper end formed with an enlarged head 311, a mediate portion formed with a catch 312 and a lower end formed with a combination hole 313. A spring 33 is mounted on the main push rod 31 of the push rod unit 30, and is rested on the catch 312 of the main push rod 31.

The ratchet socket 40 having a cylindrical shape is fixed on the lower end of the lower mounting tube 12, and has an upper end formed with an annular groove 41 for insertion of the lower end of the lower mounting tube 12 and a lower end formed with a hexagonal mounting recess 42 (see FIG. 2) and provided with a guide tube 43 located in the hexagonal mounting recess 42. A spring 45 is mounted on the guide tube 43, and is received in the hexagonal mounting recess 42. The ratchet socket 40 has a periphery formed with two opposite combination holes 44 aligning with the two opposite combination holes 123 of the lower mounting tube 12. Two screws "B" are extended through the two opposite combination holes 44 of the ratchet socket 40 and the two opposite combination holes 123 of the lower mounting tube 12, thereby locking the ratchet socket 40 on the lower end of the lower mounting tube 12.

Figure 3:
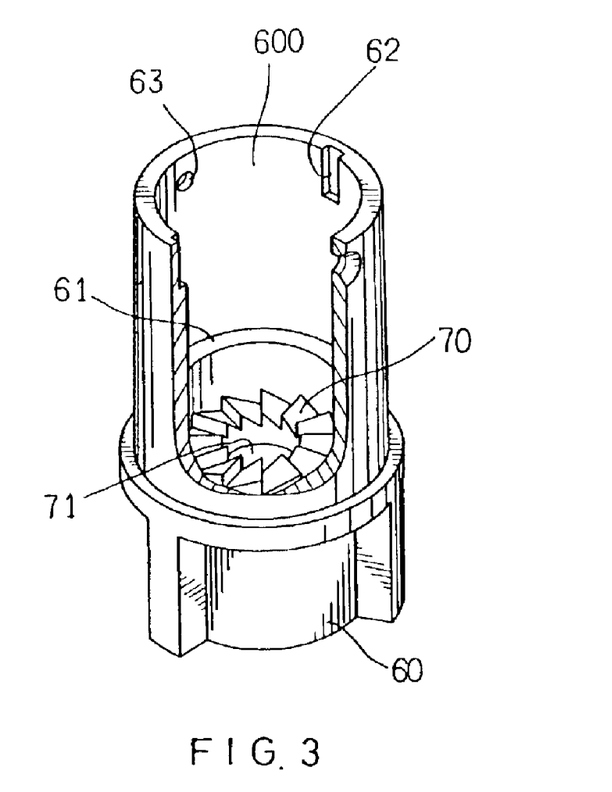
FIG. 3 is a partially cut-away perspective cross-sectional view of a pawl member of the foldable stick assembly as shown in FIG. 1.
Figure 4:
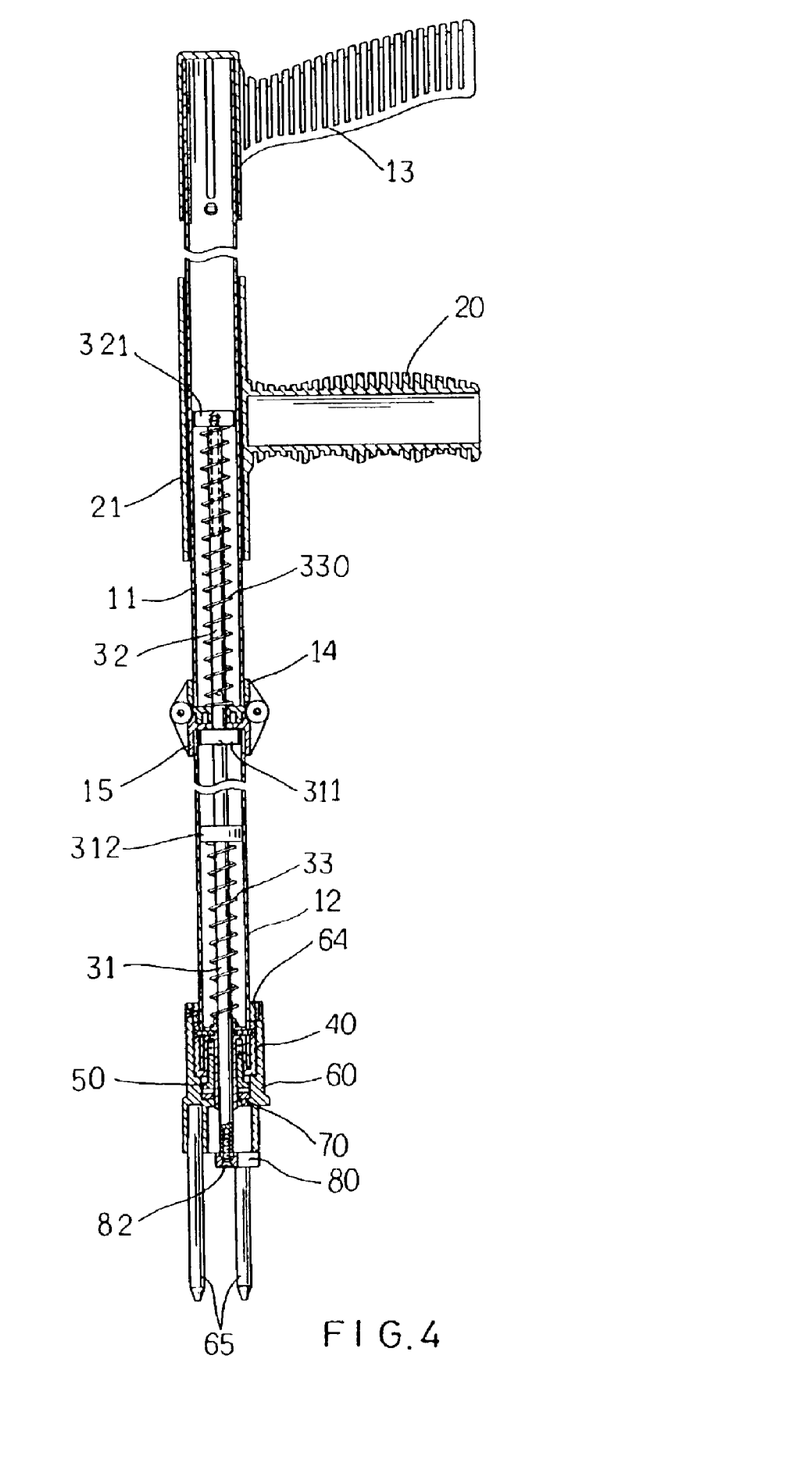
FIG. 4 is a side plan cross-sectional assembly view of the foldable stick assembly as shown in FIG. 1.
Figure 5:
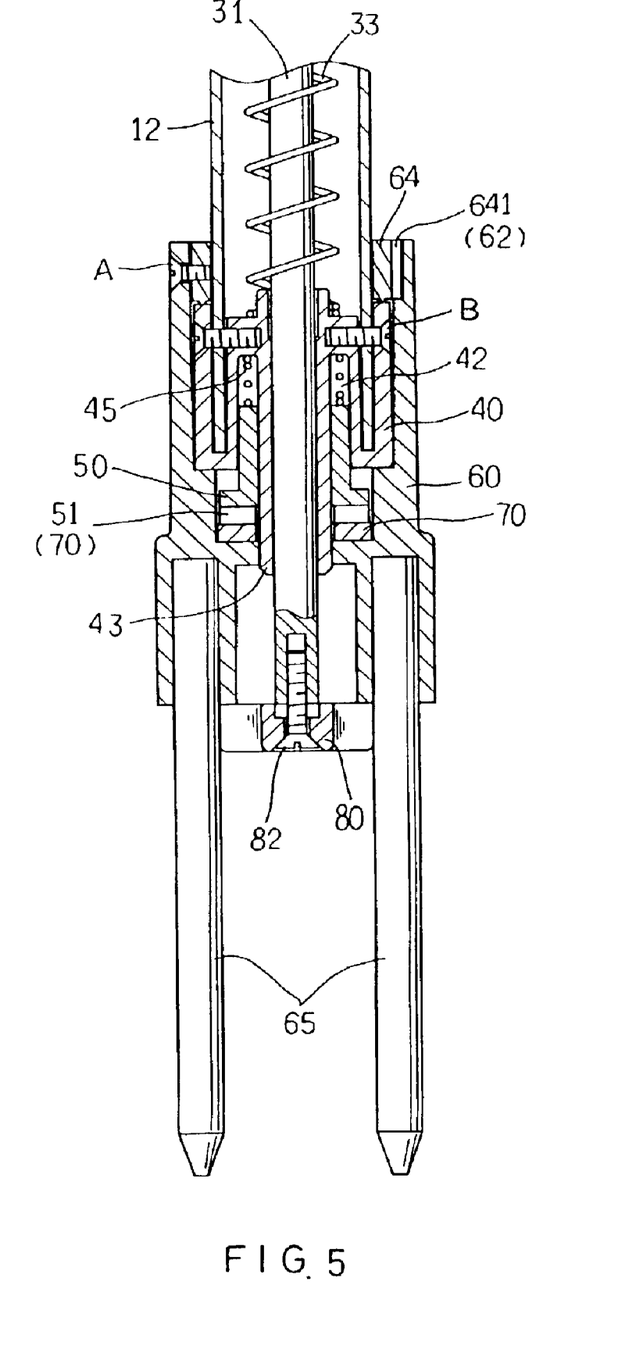
FIG. 5 is a partially enlarged view of the foldable stick assembly as shown in FIG. 4.
Figure 6:
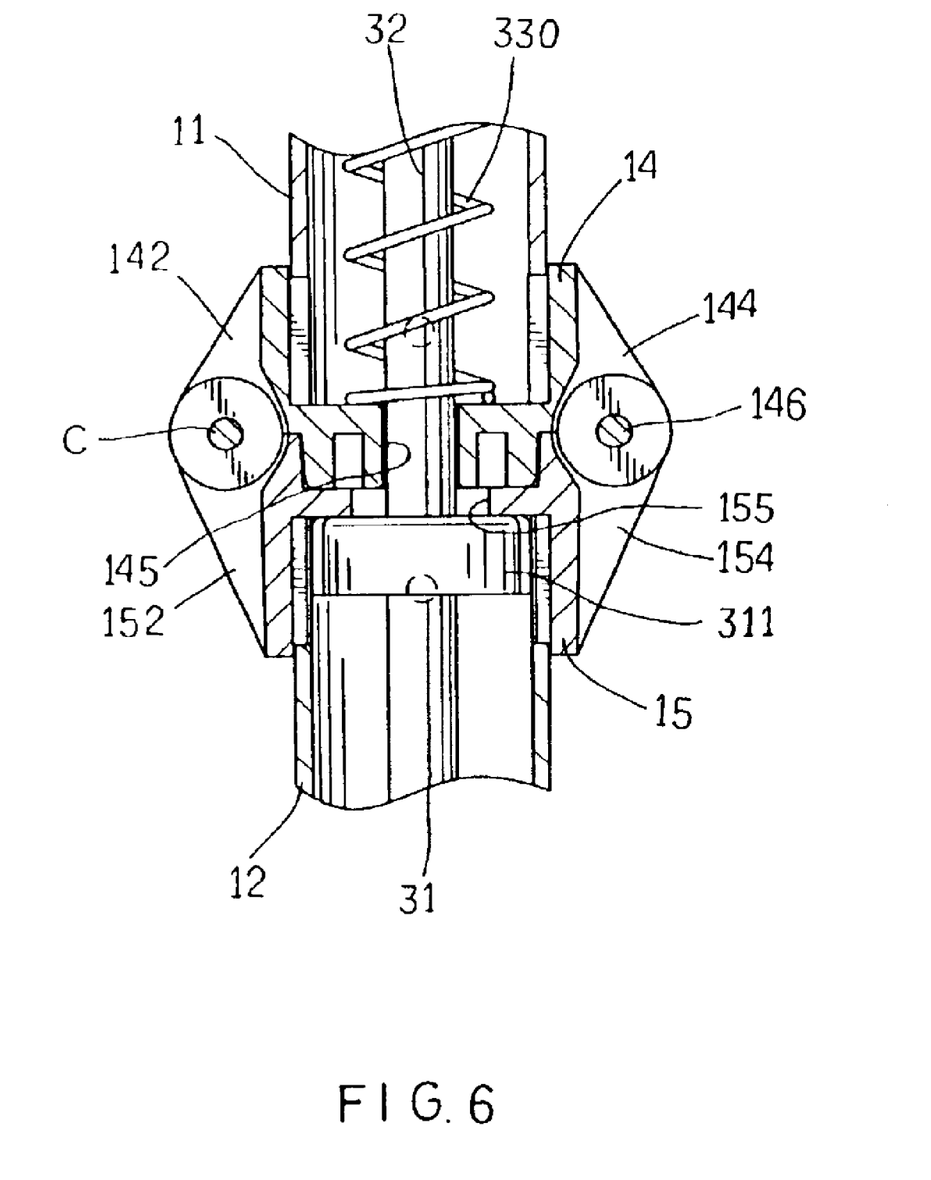
FIG. 6 is a partially enlarged view of the foldable stick assembly as shown in FIG. 4.

The pawl member 60 is mounted on the ratchet socket 40. The pawl member 60 is a cylindrical body, and is formed with an opening 600. As shown in FIG. 3, the pawl member 60 has an inner wall formed with an annular step 61 and two opposite longitudinal insertion grooves 62. The ratchet socket 40 is rested on the annular step 61 of the pawl member 60. The pawl member 60 has a periphery formed with two opposite combination holes 63. The pawl member 60 has a bottom provided with three upright posts 65 each having a pointed tip.

A catch ring 64 is mounted in the opening 600 of the pawl member 60, and is rested on a top of the ratchet socket 40. The catch ring 64 has an outer wall formed with two opposite longitudinal insertion ribs 641 inserted into the two opposite longitudinal insertion grooves 62 of the pawl member 60, and has a periphery formed with two opposite combination holes 642 aligning with the two opposite combination holes 63 of the pawl member 60. Two screws "A" are extended through the two opposite combination holes 63 of the pawl member 60 and are screwed into two opposite combination holes 642 of the catch ring 64, thereby fixing the pawl member 60 on the catch ring 64.

As shown in FIG. 3, the lower ratchet 70 is secured on a bottom of the opening 600 of the pawl member 60, and has a center formed with a guide hole 71 for passage of the guide tube 43 of the ratchet socket 40.

The upper ratchet 50 is mounted in the pawl member 60, and is engaged with the lower ratchet 70. The upper ratchet 50 has a bottom formed with a ratchet face 51 engaged with the lower ratchet 70 and a top formed with a hexagonal mounting section 52 mounted in the hexagonal mounting recess 42 of the ratchet socket 40. The hexagonal mounting section 52 has a center formed with a guide hole 53 for passage of the guide tube 43 of the ratchet socket 40.

The push block 80 is a substantially Y-shaped block, and is mounted on the three upright posts 65 of the pawl member 60. The push block 80 has a center formed with a combination hole 81 for passage of a screw 82 which is screwed into the combination hole 313 of a bottom of the main push rod 31, thereby fixing the push block 80 on the main push rod 31.

In assembly, referring to FIGS. 1–6, the catch ring 64 is initially mounted on the lower end of the lower mounting tube 12. Then, the ratchet socket 40 is mounted on the lower end of the lower mounting tube 12. Then, the two screws "B" are extended through the two opposite combination holes 44 of the ratchet socket 40 and the two opposite combination holes 123 of the lower mounting tube 12, thereby locking the ratchet socket 40 on the lower end of the lower mounting tube 12. Then, the spring 45 is mounted on the guide tube 43, and is received in the hexagonal mounting recess 42 of the ratchet socket 40. Then, the hexagonal mounting section 52 of the upper ratchet 50 is inserted into the hexagonal mounting recess 42 of the ratchet socket 40, and is urged on the spring 45. Thus, the guide tube 43 of the ratchet socket 40 is extended through the guide hole 53 of the upper ratchet 50. Then, the ratchet socket 40 and the upper ratchet 50 are inserted into the pawl member 60, with the ratchet face 51 of the upper ratchet 50 being engaged with the lower ratchet 70 in the pawl member 60, and with the ratchet socket 40 being rested on the annular step 61 of the pawl member 60. Thus, the guide tube 43 of the ratchet socket 40 is extended through the guide hole 71 the lower ratchet 70, and is protruded outward from the bottom of the pawl member 60.

Then, the catch ring 64 is mounted in the opening 600 of the pawl member 60, with the two opposite longitudinal insertion ribs 641 being inserted into the two opposite longitudinal insertion grooves 62 of the pawl member 60, and with the two opposite combination holes 642 aligning with the two opposite combination holes 63 of the pawl member 60. Then, the two screws "A" are extended through the two opposite combination holes 63 of the pawl member 60 and are screwed into two opposite combination holes 642 of the catch ring 64, thereby fixing the pawl member 60 on the catch ring 64. Thus, the catch ring 64 is rested on the ratchet socket 40, so that the pawl member 60 is retained on the lower end of the lower mounting tube 12 in a movable loose fit manner.

Then, the spring 33 is mounted on the main push rod 31 of the push rod unit 30, and is rested on the catch 312 of the main push rod 31. Then, the main push rod 31 of the push rod unit 30 is slidably mounted in the lower mounting tube 12, and is inserted into and protruded outward from the guide tube 43 of the ratchet socket 40. Then, the push block 80 is mounted on the three upright posts 65 of the pawl member 60. Then, the screw 82 is extended through the combination hole 81 of the push block 80, and is screwed into he combination hole 313 of the main push rod 31, thereby fixing the push block 80 on the main push rod 31.

Then, the lower pivot sleeve 15 of the foldable tube unit 10 is mounted on the outer wall of the upper end of the lower mounting tube 12 of the foldable tube unit 10, with the two opposite inner insertion ribs 157 of the lower pivot sleeve 15 being inserted into the two opposite longitudinal insertion grooves 121 of the lower mounting tube 12. Then, the screw 151 is extended through the combination hole 158 of the lower pivot sleeve 15, and is screwed into one of the two opposite combination holes 122 of the lower mounting tube 12, so that the lower pivot sleeve 15 of the foldable tube unit 10 is fixed on the lower mounting tube 12 of the foldable tube unit 10.

Then, the upper pivot sleeve 14 of the foldable tube unit 10 is mounted on the outer wall of the lower end of the upper mounting tube 11 of the foldable tube unit 10, with the two opposite inner insertion ribs 147 being inserted into the two opposite longitudinal insertion grooves 112 of the upper mounting tube 11. Then, the screw 141 is extended through the combination hole 148 of the upper pivot sleeve 14 and is screwed into one of tile two opposite combination holes 113 of the upper mounting tube 11, so that the upper pivot sleeve 14 of the foldable tube unit 10 is fixed on the upper mounting tube 11 of the foldable tube unit 10.

Then, the pivot pin "C" is extended through the two spaced pivot ears 142 of the upper pivot sleeve 14 and the pivot seat 152 of the lower pivot sleeve 15, so that the two spaced pivot ears 142 of the upper pivot sleeve 14 are pivotally mounted on the pivot seat 152 of the lower pivot sleeve 15. Then, the screw 146 is extended through the positioning plate 154 of the lower pivot sleeve 15 and is screwed into the positioning plate 144 of the upper pivot sleeve 14, thereby locking the positioning plate 154 of the lower pivot sleeve 15 and the positioning plate 144 of the upper pivot sleeve 14. Thus, the lower pivot sleeve 15 is combined with the upper pivot sleeve 14.

Then, the spring 330 is mounted on the upper push rod 32 of the push rod unit 30, and is rested on the enlarged head 321 of the upper push rod 32. Then, the upper push rod 32 of the push rod unit 30 is slidably mounted in the upper mounting tube 11, and the lower end of the upper push rod 32 is extended through the through hole 145 of the upper pivot sleeve 14 and the through hole 155 of the lower pivot sleeve 15, and is rested on the enlarged head 311 of the main push rod 31.

Then, the sleeve 21 of the sliding handle 20 is mounted on the outer wall of the upper mounting tube 11. Then, the fixing bolt 22 is extended through the circular hole 23 of the sleeve 21 of the sliding handle 20, the longitudinal slide slot 111 of the upper mounting tube 11, and is inserted into the fixing hole 322 of the upper push rod 32, so that the upper push rod 32 is fixed on the sleeve 21 of the sliding handle 20 to move therewith. Thus, the upper push rod 32 is moved by the sleeve 21 of the sliding handle 20, and the spring 330 is urged between the enlarged head 321 of the upper push rod 32 and the upper pivot sleeve 14.

Then, the handle 13 of the foldable tube unit 10 is mounted on the upper end of the upper mounting tube 11 of the foldable tube unit 10, thereby assembling the foldable stick assembly in accordance with the preferred embodiment of the present invention as shown in FIG. 7.

Figure 8:
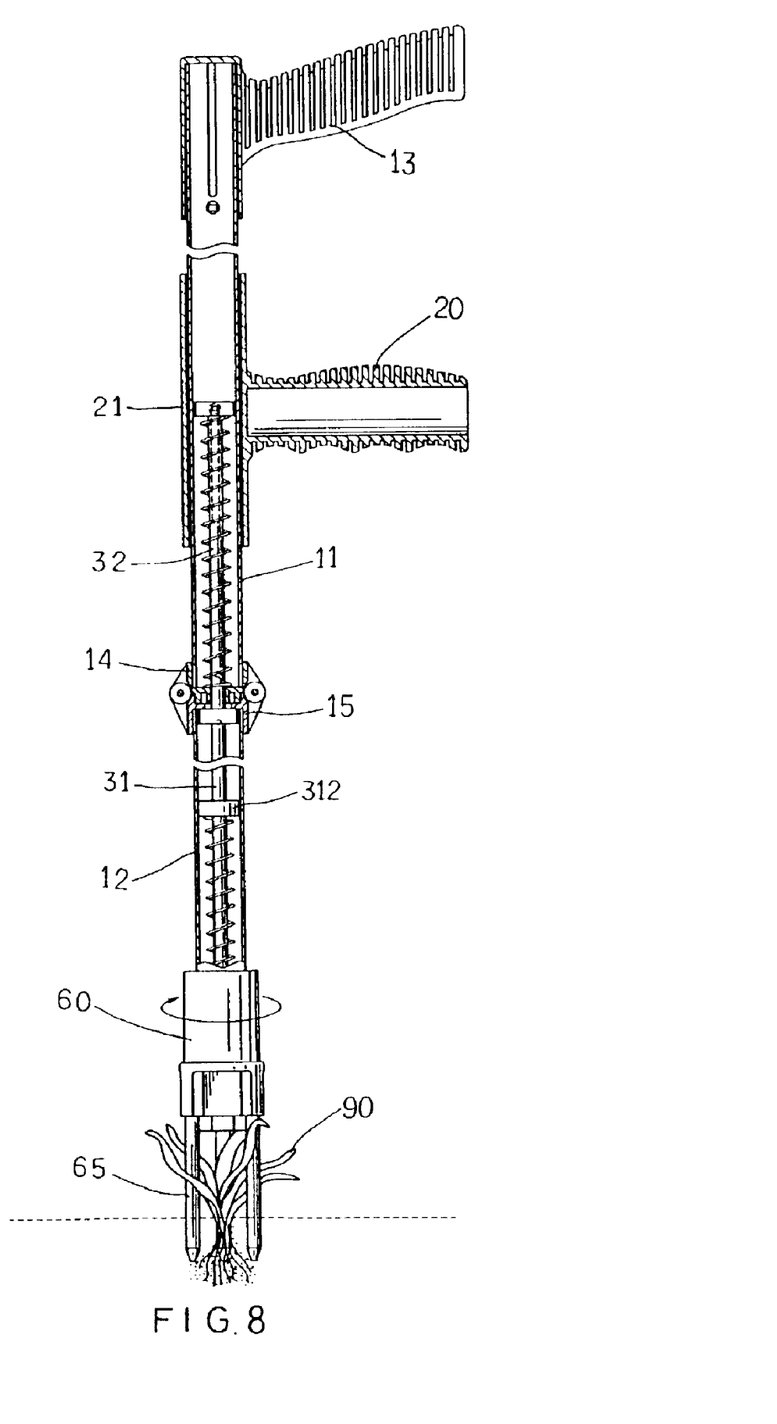
FIG. 8 is a schematic operational view of the foldable stick assembly as shown in FIG. 4 in use.
Figure 9:
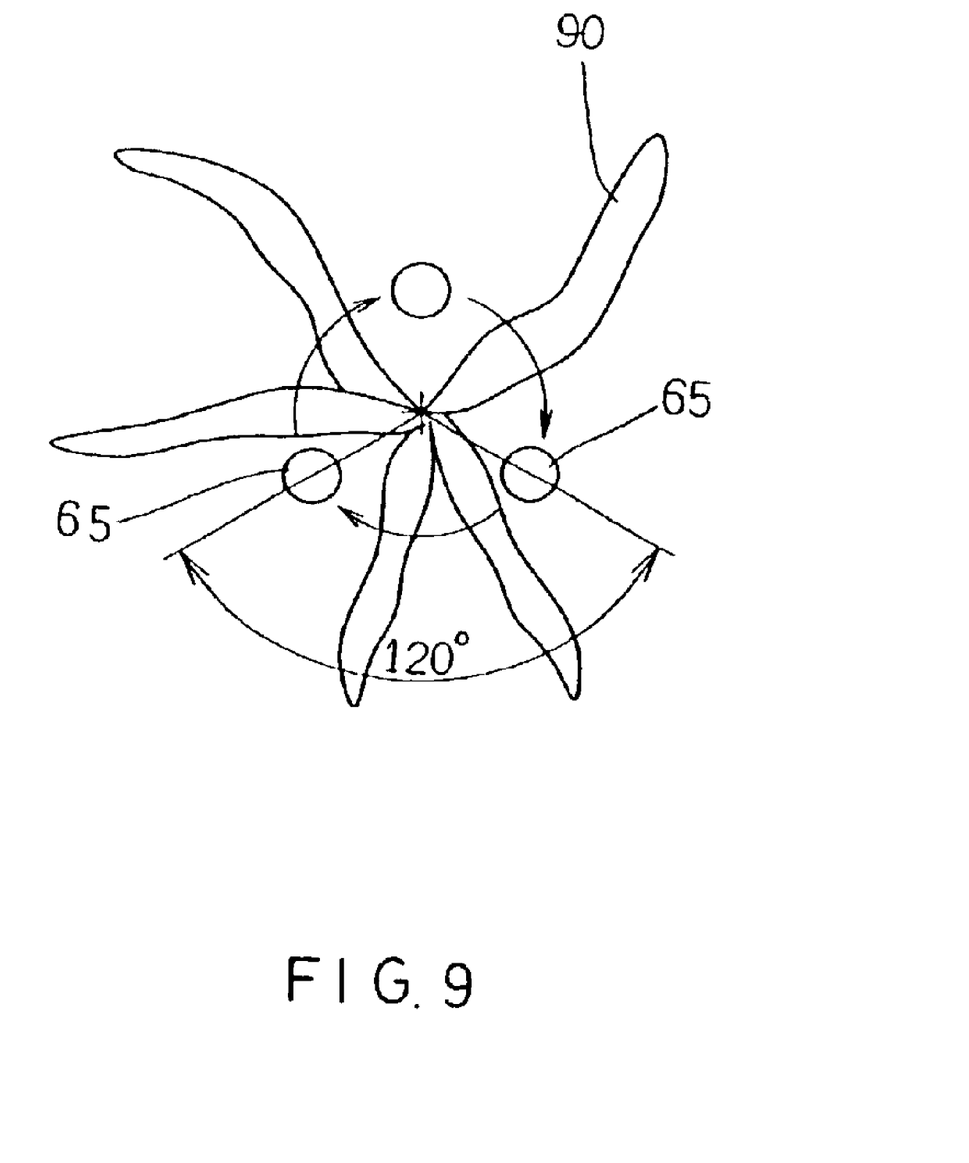
FIG. 9 is a schematic top plan view of the foldable stick assembly as shown in FIG. 8 in use.

In operation, referring to FIGS. 8 and 9, the three upright posts 65 of the pawl member 60 are inserted into the soil to encompass the weeds 90. The user holds the handle 13 of the foldable tube unit 10 to rotate the foldable tube unit 10 in the direction opposite to that of the ratchet teeth of the upper ratchet 50 and the lower ratchet 70, so that the lower ratchet 70 fixed in the pawl member 60 is rotated by the upper ratchet 50 fixed on the ratchet socket 40, so as to rotate the pawl member 60, thereby rotating the three upright posts 65 of the pawl member 60 so as to cut and remove the weeds 90. When the foldable tube unit 10 is rotated in the reverse direction, the ratchet teeth of the upper ratchet 50 and the lower ratchet 70 disengage each other, so that the foldable tube unit 10 idles.

Figure 10:
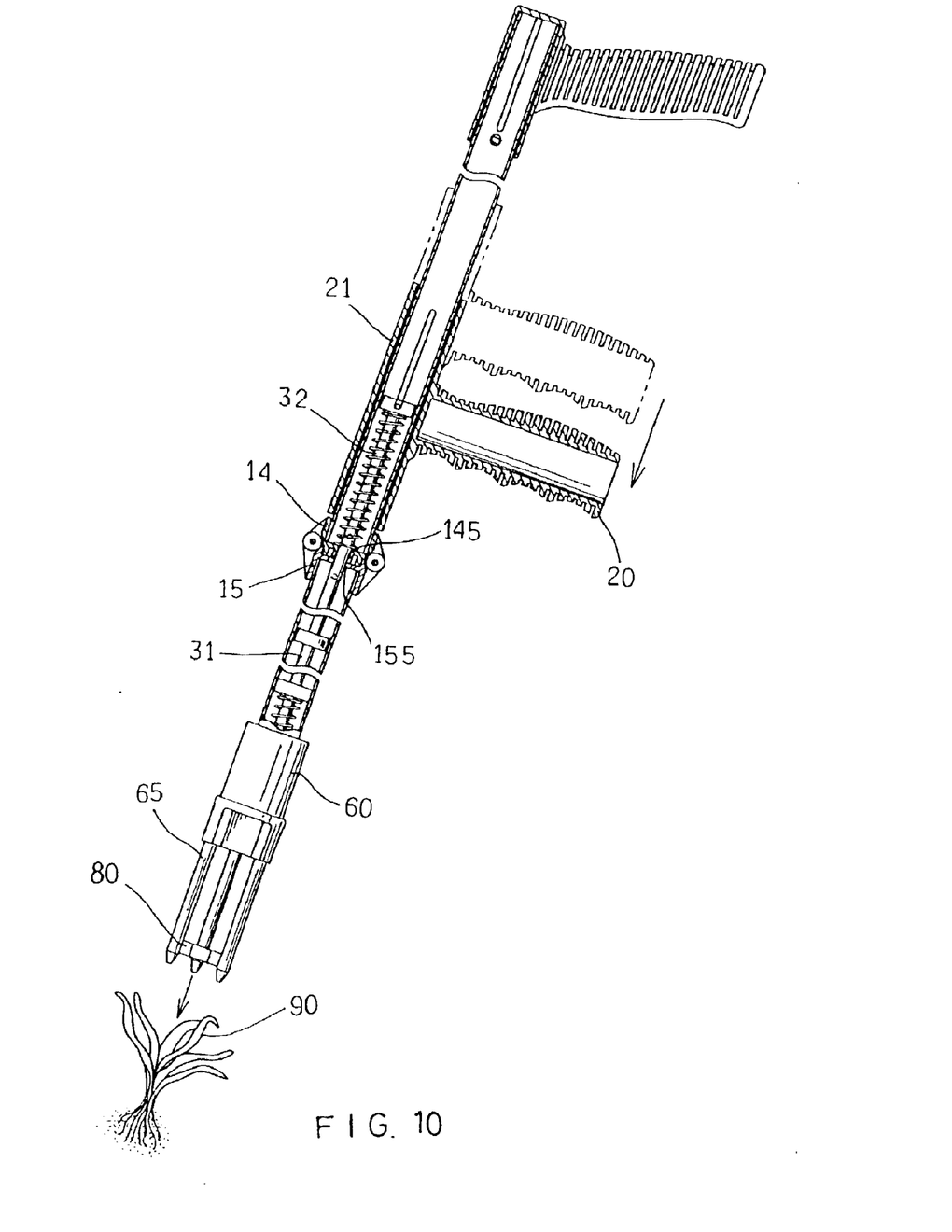
FIG. 10 is a schematic operational view of the foldable stick assembly as shown in FIG. 8 in use.

Referring to FIG. 10, the sleeve 21 of the sliding handle 20 is pushed to move on the outer wall of the upper mounting tube 11, so that the upper push rod 32 of the push rod unit 30 is moved in the upper mounting tube 11 to push the enlarged head 311 of the main push rod 31 so as to move the main push rod 31 which moves the push block 80 to push the weeds 90 attached on the three upright posts 65 of the pawl member 60 outward, thereby removing the weeds 90. In addition, the three upright posts 65 of the pawl member 60 are inserted into the soil to loosen the soil. Further, the three upright posts 65 of the pawl member 60 are rested on the ground to provide an auxiliary support effect for the older people.

Figure 11:
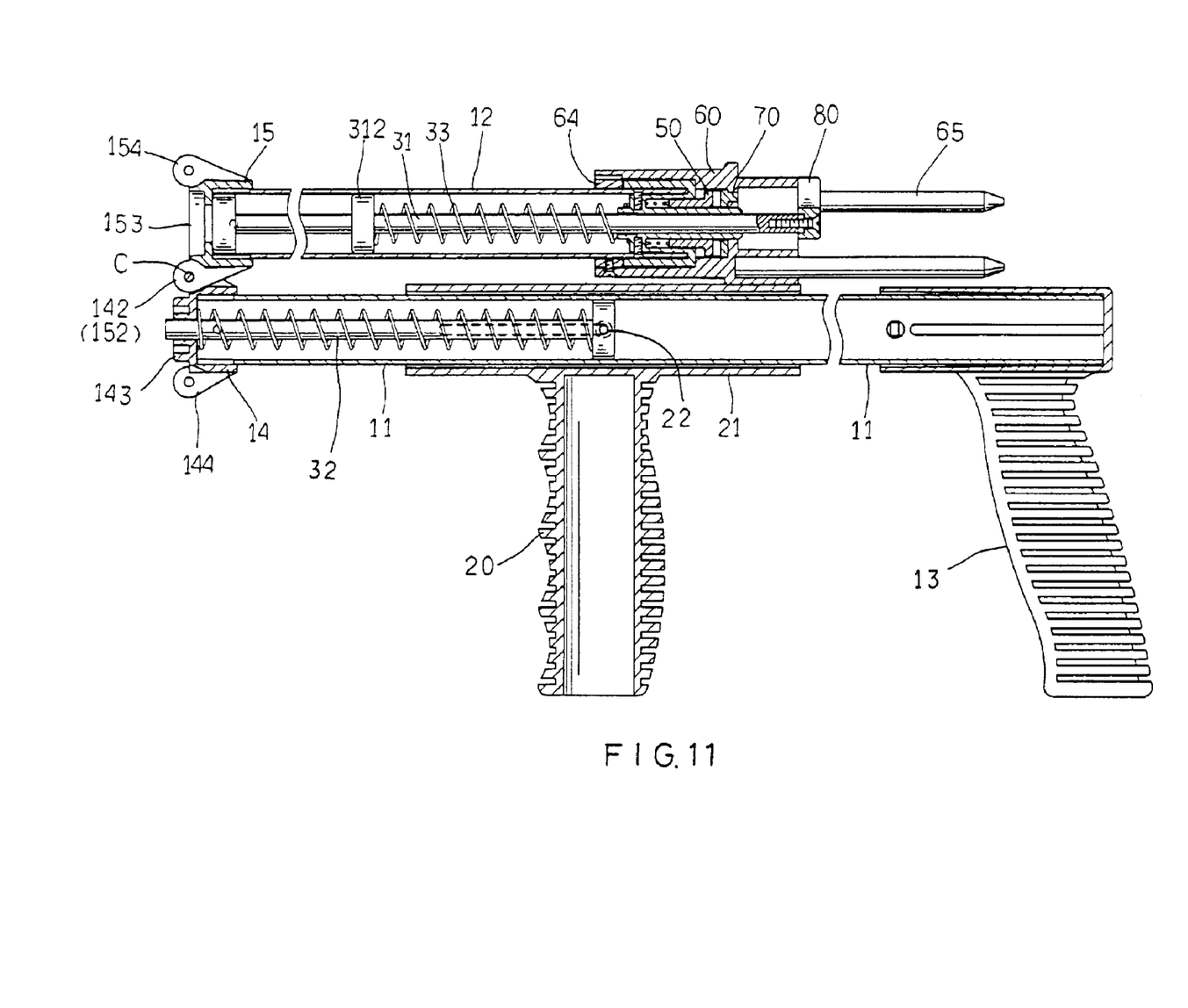
FIG. 11 is a plan cross-sectional assembly view showing a folded state of the foldable stick assembly as shown in FIG. 1.

Referring to FIG. 11, the screw 146 is unscrewed from the positioning plate 144 of the upper pivot sleeve 14, and is released from the positioning plate 154 of the lower pivot sleeve 15, thereby unlocking the positioning plate 154 of the lower pivot sleeve 15 from the positioning plate 144 of the upper pivot sleeve 14, so that the upper pivot sleeve 14 is pivoted relative to the lower pivot sleeve 15, and the upper mounting tube 11 is pivoted relative to the lower mounting tube 12, thereby folding the foldable stick assembly. Thus, the volume of the foldable stick assembly is greatly reduced, thereby facilitating storage and transportation of the foldable stick assembly, and thereby decreasing the cost of assembly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A foldable stick assembly, comprising a foldable tube unit, a sliding handle, a push rod unit, a ratchet socket, an upper ratchet, a pawl member, and a lower ratchet, wherein:

the foldable tube unit includes a handle, an upper mounting tube, a lower mounting tube, an upper pivot sleeve, and a lower pivot sleeve, wherein:

the upper mounting tube of the foldable tube unit has a lower portion formed with a longitudinal slide slot;

the upper pivot sleeve of the foldable tube unit is mounted on the outer wall of a lower end of the upper mounting tube of the foldable tube unit; and the lower pivot sleeve of the foldable tube unit is mounted on the outer wall of the upper end of the lower mounting tube of the foldable tube unit, and is combined with the upper pivot sleeve of the foldable tube unit;

the sliding handle includes a sleeve mounted on the outer wall of the upper mounting tube and having a periphery formed with a circular hole;

the push rod unit includes a main push rod and an upper push rod, wherein:

the upper push rod of the push rod unit is slidably mounted in the upper mounting tube, and is fixed to the sleeve of the sliding handle, the upper push rod of the push rod unit has an upper end formed with an enlarged head formed with a fixing hole, a fixing bolt is extended through the circular hole of the sleeve of the sliding handle, the longitudinal slide slot of the upper mounting tube, and is inserted into the fixing hole of the upper push rod, so that the upper push rod is fixed on the sleeve of the sliding handle to move therewith; and the main push rod of the push rod unit is slidably mounted in the lower mounting tube, and is moved by the upper push rod of the push rod unit, the main push rod of the push rod unit has a mediate portion formed with a catch, a spring is mounted on the main push rod of the push rod unit, and is rested on the catch of the main push rod;

the ratchet socket is fixed on the lower end of the lower mounting tube, and has an upper end formed with an annular groove for insertion of the lower end of the lower mounting tube and a lower end formed with a hexagonal mounting recess and provided with a guide tube located in the hexagonal mounting recess;

the pawl member is mounted on the ratchet socket, and is formed with an opening, the pawl member has an inner wall formed with an annular step for supporting the ratchet socket, the pawl member has a bottom provided with three upright posts each having a pointed tip, a catch ring is fixed in the opening of the pawl member, and is rested on a top of the ratchet socket;

the lower ratchet is secured on a bottom of the opening of the pawl member; and the upper ratchet is mounted in the pawl member and is engaged with the lower ratchet, the upper ratchet has a top formed with a hexagonal mounting section mounted in the hexagonal mounting recess of the ratchet socket.

2. The foldable stick assembly in accordance with claim 1, wherein the handle of the foldable tube unit is mounted on the upper end of the upper mounting tube of the foldable tube unit.

3. The foldable stick assembly in accordance with claim 1, wherein the upper mounting tube of the foldable tube unit has a lower end formed with two opposite longitudinal insertion grooves and two opposite combination holes, the upper pivot sleeve of the foldable tube unit has an inner wall formed with two opposite inner insertion ribs inserted into the two opposite longitudinal insertion grooves of the upper mounting tube, the upper pivot sleeve of the foldable tube unit has a periphery formed with a combination hole for passage of a screw which is screwed into one of the two opposite combination holes of the upper mounting tube, so that the upper pivot sleeve of the foldable tube unit is fixed on the upper mounting tube of the foldable tube unit.

4. The foldable stick assembly in accordance with claim 1, wherein the lower mounting tube of the foldable tube unit has an upper end formed with two opposite longitudinal insertion grooves and two opposite combination holes, the lower pivot sleeve of the foldable tube unit has an inner wall formed with two opposite inner insertion ribs inserted into the two opposite longitudinal insertion grooves of the lower mounting tube, and the lower pivot sleeve of the foldable tube unit has a periphery formed with a combination hole for passage of a screw which is screwed into one of the two opposite combination holes of the lower mounting tube, so that the lower pivot sleeve of the foldable tube unit is fixed on the lower mounting tube of the foldable tube unit.

5. The foldable stick assembly in accordance with claim 1, wherein the lower mounting tube of the foldable tube unit has a lower end formed with two opposite combination holes, the ratchet socket has a periphery formed with two opposite combination holes aligning with the two opposite combination holes of the lower mounting tube, and two screws are extended through the two opposite combination holes of the ratchet socket and the two opposite combination holes of the lower mounting tube, thereby locking the ratchet socket on the lower end of the lower mounting tube.

6. The foldable stick assembly in accordance with claim 1, wherein the upper pivot sleeve of the foldable tube unit has an outer wall formed with two spaced pivot ears and a positioning plate, the lower pivot sleeve of the foldable tube unit has an outer wall formed with a pivot seat mounted between the two spaced pivot ears of the upper pivot sleeve, and a pivot pin is extended through the two spaced pivot ears of the upper pivot sleeve and the pivot seat of the lower pivot sleeve, so that the two spaced pivot ears of the upper pivot sleeve are pivotally mounted on the pivot seat of the lower pivot sleeve.

7. The foldable stick assembly in accordance with claim 1, wherein the upper pivot sleeve of the foldable tube unit has an outer wall formed with a positioning plate, the lower pivot sleeve of the foldable tube unit has an outer wall formed with a positioning plate, and a screw is extended through the positioning plate of the lower pivot sleeve and is screwed into the positioning plate of the upper pivot sleeve, thereby locking the positioning plate of the lower pivot sleeve and the positioning plate of the upper pivot sleeve.

8. The foldable stick assembly in accordance with claim 1, wherein the upper pivot sleeve of the foldable tube unit has a bottom protruded with an insertion body and formed with a through hole, and the lower pivot sleeve of the foldable tube unit has a top formed with an insertion hole for insertion of the insertion body of the upper pivot sleeve, and formed with a through hole aligning with the through hole of the upper pivot sleeve.

9. The foldable stick assembly in accordance with claim 1, wherein the sliding handle includes a handgrip secured on the sleeve.

10. The foldable stick assembly in accordance with claim 1, wherein the main push rod of the push rod unit has an upper end formed with an enlarged head rested on the lower end of the upper push rod.

11. The foldable stick assembly in accordance with claim 1, wherein the main push rod of the push rod unit has a lower end formed with a combination hole, and the foldable stick assembly further comprises a push block mounted on the three upright posts of the pawl member and having a center formed with a combination hole for passage of a screw which is screwed into the combination hole of the main push rod, thereby fixing the push block on the main push rod.

12. The foldable stick assembly in accordance with claim 1, further comprising a spring mounted on the upper push rod of the push rod unit and rested on the enlarged head of the upper push rod.

13. The foldable stick assembly in accordance with claim 1, further comprising a spring mounted on the guide tube and received in the hexagonal mounting recess.

14. The foldable stick assembly in accordance with claim 1, wherein the pawl member has an inner wall formed with two opposite longitudinal insertion grooves, and the catch ring has an outer wall formed with two opposite longitudinal insertion ribs inserted into the two opposite longitudinal insertion grooves of the pawl member.

15. The foldable stick assembly in accordance with claim 1, wherein the pawl member has a periphery formed with two opposite combination holes, the catch ring and has a periphery formed with two opposite combination holes aligning with the two opposite combination holes of the pawl member, and two screws are extended through the two opposite combination holes of the pawl member and are screwed into two opposite combination holes of the catch ring, thereby fixing the pawl member on the catch ring.

16. The foldable stick assembly in accordance with claim 1, wherein the upper ratchet has a bottom formed with a ratchet face engaged with the lower ratchet.

17. The foldable stick assembly in accordance with claim 1, wherein the hexagonal mounting section of the upper ratchet has a center formed with a guide hole for passage of the guide tube of the ratchet socket.

18. The foldable stick assembly in accordance with claim 1, wherein the lower ratchet has a center formed with a guide hole for passage of the guide tube of the ratchet socket.

* * * * *